US009167430B2

United States Patent
Zhao et al.

(10) Patent No.: US 9,167,430 B2
(45) Date of Patent: Oct. 20, 2015

(54) ACCESS METHOD AND SYSTEM, AND MOBILE INTELLIGENT ACCESS POINT

(75) Inventors: Youchun Zhao, Shenzhen (CN); Shilin You, Shenzhen (CN); ZaiFeng Zong, Shenzhen (CN); XiaoDong Zhu, Shenzhen (CN); JianYe Liu, Shenzhen (CN); Se Wu, Shenzhen (CN); WeiBin Wang, Shenzhen (CN); JinGuo Zhu, Shenzhen (CN); Jun Meng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 38 days.

(21) Appl. No.: 14/235,093

(22) PCT Filed: May 10, 2012

(86) PCT No.: PCT/CN2012/075311
§ 371 (c)(1),
(2), (4) Date: Jan. 27, 2014

(87) PCT Pub. No.: WO2013/016968
PCT Pub. Date: Feb. 7, 2013

(65) Prior Publication Data
US 2014/0189838 A1 Jul. 3, 2014

(30) Foreign Application Priority Data

Aug. 3, 2011 (CN) .......................... 2011 1 0220979

(51) Int. Cl.
*G06F 7/04* (2006.01)
*H04W 12/06* (2009.01)
(Continued)

(52) U.S. Cl.
CPC ............. *H04W 12/06* (2013.01); *H04L 63/083* (2013.01); *H04L 63/0892* (2013.01); *H04W 12/08* (2013.01); *H04W 76/022* (2013.01); *H04W 88/10* (2013.01)

(58) Field of Classification Search
CPC ... H04W 12/06; H04W 76/022; H04W 12/08; H04W 88/10; H04L 63/083; H04L 63/0892
See application file for complete search history.

(56) References Cited

U.S. PATENT DOCUMENTS 6,067,297 A     5/2000 Beach
8,494,543 B2 *  7/2013 Koodli et al. ................. 455/453
(Continued)

FOREIGN PATENT DOCUMENTS

CN    101198150 A    6/2008
CN    101227708 A    7/2008
(Continued)

OTHER PUBLICATIONS

International Search Report in international application No. PCT/CN2012/075311 mailed on Aug. 16, 2012.
(Continued)

*Primary Examiner* — Nirav B Patel
*Assistant Examiner* — Mohammed Waliullah
(74) *Attorney, Agent, or Firm* — Oppedahl Patent Law Firm LLC

(57) ABSTRACT

An access method is disclosed. The method includes: a mobile intelligent access point accesses a network through at least two wireless technologies; a User Equipment (UE) establishes a connection with the mobile intelligent access point; and the UE acquires access authentication from the network through the mobile intelligent access point. An access system and a mobile intelligent access point are further disclosed. With the disclosure, network authentication can be implemented to facilitate an operator to control the number of access users and to guarantee the network of the operator. Furthermore, a broadband mobile network is taken as a backhaul network, so as to reduce the reliability on a fixed network and improve the utilization of the broadband mobile network.

7 Claims, 5 Drawing Sheets

(51) Int. Cl.
*H04L 29/06* (2006.01)
*H04W 12/08* (2009.01)
*H04W 76/02* (2009.01)
*H04W 88/10* (2009.01)

(56) References Cited

U.S. PATENT DOCUMENTS

| | | | |
|---|---|---|---|
| 8,495,714 B2 * | 7/2013 | Jones et al. | 726/5 |
| 2005/0030908 A1 * | 2/2005 | Lehmann et al. | 370/265 |
| 2005/0153684 A1 | 7/2005 | Rodrigo | |
| 2007/0178885 A1 | 8/2007 | Lev | |
| 2012/0002594 A1 | 1/2012 | Racz | |

FOREIGN PATENT DOCUMENTS

| | | |
|---|---|---|
| EP | 2127198 A1 | 12/2009 |
| JP | 2001156788 A | 6/2001 |
| WO | 2007114710 A2 | 10/2007 |
| WO | 2008/116972 A1 | 10/2008 |
| WO | 2010104435 A1 | 9/2010 |

OTHER PUBLICATIONS

English Translation of the Written Opinion of the International Search Authority in international application No. PCT/CN2012/075311, Aug. 16, 2012.
Supplementary European Search Report in European application No. 12820692.7, mailed on Feb. 17, 2015.
User Guide MIFI3G4G Mobile Hotspot by Novatel Wireless Browser Interface, Sprint, Mar. 31, 2011, See Supplementary European Search Report.
ETSI TS 133 402 V10.0.0, Digital cellular telecommunications system (Phase 2+); Universal Mobile Telecommunications System (UMTS); LTE; 3GPP System Architecture Evolution (SAE); Security aspects of non-3GPP accesses (3GPP TS 33.402 version 10.0.0 Release 10), May 1, 2011, See Supplementary European Search Report.
ETSI TS 123 234 V10.0.0, Universal Mobile Telecommunications System (UMTS); LTE; 3GPP system to Wireless Local Area Network (WLAN) interworking; System description (3GPP TS 23.234 version 10.0.0 Release 10), Mar. 1, 2011, See Supplementary European Search Report.

* cited by examiner

ACCESS METHOD AND SYSTEM, AND MOBILE INTELLIGENT ACCESS POINT

TECHNICAL FIELD

The disclosure relates to the field of communications, and in particular to an access method, an access system and a mobile intelligent access point.

BACKGROUND

During the development course of packet data, a Packet Switched (PS) network includes a Global System for Mobile Communications (GSM) EDGE Radio Access Network (GERAN) and a Universal Terrestrial Radio Access Network (UTRAN), and a core network includes a Serving General Packet Radio Service (GPRS) Support Node (SGSN) and a Gateway GPRS Support Node (GGSN). The SGSN, which is a service support point for a GERAN User Equipment (UE) and a UTRAN UE to access an Evolved Packet Core (EPC) network, is responsible for the location updating, paging management, bearer management and other functions of the UE; while the GGSN supports the edge routing function of the GPRS network, namely, the GGSN is responsible for routing forwarding of data of the GPRS network, and further protects the integrity of the data of the GPRS network via a firewall and a filtering function. The GGSN further has a charging function.

In order to remain the strong competitiveness of the 3rd Generation (3G) mobile communication system in the field of mobile communications, it is necessary to improve its network performance and reduce the network construction and operation costs. Therefore, a standard working group of the 3rd Generation Partnership Project (3GPP) is now dedicated to study the next generation evolution of a core network system, i.e., an EPC network, in order to provide the UE with a higher transmission rate and a shorter transmission delay. The EPC system supports the access of an Evolved Universal Terrestrial Radio Access Network (E-UTRAN), and supports the access of a non-3GPP access network, for example, a Wireless Local Area Network (WLAN), such as Wireless Fidelity (WiFi).

FIG. 1 is a diagram showing the system architecture of an Evolved Packet System (EPS) in the related art. As shown in FIG. 1, the EPS consists of an access network and an EPC network. The access network may be an E-UTRAN or the like. The EPC network includes a Mobility Management Entity (MME), a Serving Gateway (S-GW), a Packet Data Network Gateway (P-GW), a Home Subscriber Server (HSS), a 3GPP Authentication, Authorization and Accounting (3GPP AAA) server, a Policy and Charging Rules Function (PCRF) and other support nodes.

The MME is responsible for mobility management, signalling processing of a non-access-stratum, management of user contexts, and other works related to a control plane. The S-GW, which is an access gateway device connected with the E-UTRAN, forwards data between the E-UTRAN and the P-GW, and is responsible for caching paging waiting data. The P-GW, which is a border gateway between a 3GPP EPS and a Packet Data Network (PDN), is responsible for accessing a UE to the PDN and forwarding data between the EPS and the PDN. Furthermore, the existing P-GW can further support the access of a conventional PSN, namely, the P-GW has the function of the GGSN. The PCRF, which is a PCRF entity, is connected with an operator Internet Protocol (IP) service network through a receiving interface Rx and acquires service information. In addition, the PCRF is further connected with a gateway device in the network through a Gx/Gxa/Gxc interface and is responsible for initiating the establishment of an IP bearer, ensuring the Quality of Service (QoS) of service data and controlling charging.

The EPS also supports the access of UE via other non-3GPP systems besides the E-UTRAN. The access of the non-3GPP systems is implemented through an S2a/b/c interface, and the P-GW serves as a data anchor point for the access of a 3GPP system and a non-3GPP system. In the system architecture of the EPS, the non-3GPP system is divided into a trusted non-3GPP IP access network and a non-trusted non-3GPP IP access network. The trusted non-3GPP IP access network can be connected with the P-GW directly through the S2a interface, while the non-trusted non-3GPP IP access network needs to be connected with the P-GW through an Evolved Packet Data Gateway (ePDG) and an interface between the ePDG and the P-GW is the interface S2b. The interface S2c, which is an interface between the UE and the P-GW, provides control and mobility management through a Mobile IPv6 Support for Dual Stack Hosts and Routers (DSMIPv6) protocol.

Existing wireless access network users access a fixed access network through a wireless access point and then access an external network server to implement the corresponding data services. The fixed access adopts a fixed optical fiber/coaxial cable and other technologies to complete a backhaul network and to implement a network transmission function. The authentication for a wireless access user is controlled at the wireless access point, which controls the access of the wireless access user specifically by setting a password. A network operator cannot control the access a user at a the wireless access point deployed by the user, namely, the network cannot identify the corresponding users so as to fail to charge the user; Furthermore, the operator can acquire a verification password and a user name via other mobile devices instead of directly verifying and authenticating the access user.

Therefore, all existing backhaul networks adopt a fixed technological network optical fiber to lay a fixed network, which has a high requirement on the geography and is very difficult in laying. Both the existing 3G network and the existing Long Term Evolution (LTE) network belong to a high broadband network and can provide the same services as those provided by the fixed network, but there is still no related technologies for a mobile operator network to directly authenticate an access user in such scenario.

SUMMARY

In view of this, the disclosure is intended to provide an access method, an access system and a mobile intelligent access point, so as to implement network authentication and guarantee the network of an operator, and further to reduce the reliability on a fixed network and improve the utilization of a broadband mobile network.

To this end, the technical solutions of the embodiments of the disclosure are implemented as follows.

An access method includes:

a mobile intelligent access point accesses a network through at least two wireless technologies;

a UE establishes a connection with the mobile intelligent access point; and the UE acquires access authentication from the network through the mobile intelligent access point.

The method may further include:

after the mobile intelligent access point accesses the network, the network provides an uplink data policy of the mobile intelligent access point to the mobile intelligent access point; and the mobile intelligent access point selects different data connections according to the uplink data policy to transmit uplink data after the uplink data are received by the mobile intelligent access point.

The process that the UE acquires the access authentication from the network through the mobile intelligent access point may include:

the UE sends a Hyper Text Transport Protocol (HTTP) request message to a P-GW or a GGSN through the mobile intelligent access point;

the P-GW or the GGSN sends a user authentication page to the UE through the mobile intelligent access point when the P-GW or the GGSN confirms that an IP address of the UE is not authenticated and the UE accesses the network through the mobile intelligent access point; and after a 3GPP AAA server verifies a user name and a password successfully, a web portal server initiates challenge authentication to the P-GW or the GGSN, and the P-GW or the GGSN acquires charging information from the 3GPP AAA server.

The process that the UE acquires the access authentication from the network through the mobile intelligent access point may include:

the UE sends an HTTP request message to the mobile intelligent access point;

the mobile intelligent access point forwards the HTTP request message to the P-GW or the GGSN, wherein the HTTP request message includes an address and a Service Set Identifier (SSID) of the web portal server;

the P-GW or the GGSN confirms that the IP address of the UE is not authenticated and the UE accesses the network through the mobile intelligent access point;

the P-GW or the GGSN pushes an HTTP response including a user authentication page to the mobile intelligent access point;

the mobile intelligent access point forwards the user authentication page to the UE;

after a user inputs the user name and the password on the authentication page, an HTTP POST request is sent to the web portal server through the mobile intelligent access point, and the P-GW or the GGSN, wherein the HTTP POST request includes the address of the web portal server, the user name and the password;

the web portal server initiates a user information request to the 3GPP AAA server;

the 3GPP AAA server verifies the user name and the password;

after the user name and the password are verified successfully, the 3GPP AAA server sends a user information request response message to the web portal server;

the web portal server initiates challenge authentication to the P-GW or the GGSN, and the P-GW or the GGSN acquires charging information from the 3GPP AAA server; and after the authentication is successful, the web portal server sends an HTTP response including authentication success information to the UE through the P-GW or the GGSN, and the mobile intelligent access point; and the UE performs a data service through the mobile intelligent access point.

The process that the UE acquires the access authentication from the network through the mobile intelligent access point may include:

the UE sends an HTTP request message to a web portal server through the mobile intelligent access point;

the web portal server sends a user authentication page to the UE through the mobile intelligent access point when the web portal server confirms that an IP address of the UE is not authenticated and the UE accesses the mobile intelligent access point; and after a 3GPP AAA server verifies the user name and the password successfully, the web portal server initiates challenge authentication to the mobile intelligent access point, and the mobile intelligent access point acquires charging information from the 3GPP AAA server.

The process that the UE acquires the access authentication from the network through the mobile intelligent access point may specifically include:

the UE sends an HTTP request message to the mobile intelligent access point;

the mobile intelligent access point forwards the HTTP request message to the web portal server, wherein the HTTP request message includes an address and an SSID of the web portal server; or, the mobile intelligent access point sends the HTTP request message to a Broadband Remote Access Server (BRAS), and the BRAS forwards the HTTP request message to the web portal server, wherein the HTTP request message includes an address and an SSID of the web portal server;

the web portal server confirms that the IP address of the UE is not authenticated and the UE accesses the mobile intelligent access point;

the web portal server pushes an HTTP response including a user authentication page to the mobile intelligent access point;

the mobile intelligent access point forwards the user authentication page to the UE;

after a user inputs the user name and the password on the authentication page, an HTTP POST request is sent to the web portal server through the mobile intelligent access point and the P-GW or the GGSN, wherein the HTTP POST request includes the address of the web portal server, the user name and the password;

the web portal server initiates a user information request to the 3GPP AAA server;

the 3GPP AAA server verifies the user name and the password and sends a user information request response message to the web portal server after the user name and the password are verified successfully;

the web portal server initiates challenge authentication to the mobile intelligent access point, and the mobile intelligent access point acquires charging information from the 3GPP AAA server; and after the authentication is successful, the web portal server sends an HTTP response including authentication success information to the UE through the mobile intelligent access point; and the UE performs a data service through the mobile intelligent access point.

An access system includes: a UE, a mobile intelligent access point and a network, wherein the mobile intelligent access point is configured to access the network through at least two wireless technologies; and the UE is configured to establish a connection with the mobile intelligent access point and acquire access authentication from the network through the mobile intelligent access point.

The network may be further configured to provide an uplink data policy of the mobile intelligent access point to the mobile intelligent access point after the mobile intelligent access point accesses the network; and the mobile intelligent access point may be further configured to select different data connections according to the uplink data policy to transmit uplink data after receiving the uplink data.

The mobile intelligent access point may include: a WiFi AP module, a core processing module, an LTE UE module and a 3G UE module, wherein the LTE UE module may be configured to enable the mobile intelligent access point to access an LTE core network via an E-UTRAN;

the 3G UE module may be configured to enable the mobile intelligent access point to access a 3G core network via a UTRAN;

the WiFi AP module may be configured to enable the mobile intelligent access point to process access of the UE, and enable a terminal supportive of a WiFi function to access the mobile intelligent access point and to perform a related HTTP service after the terminal supportive of the WiFi function is authenticated by the network successfully; and the core processing module may be configured to convert WiFi messages/data into LTE or 3G messages/data and convert the LTE or 3G messages/data into the WiFi messages/data.

The process that the UE acquires the access authentication from the network through the mobile intelligent access point may include:

the UE sends an HTTP request message to a P-GW or a GGSN through the mobile intelligent access point;

the P-GW or the GGSN sends a user authentication page to the UE through the mobile intelligent access point when the P-GW or the GGSN confirms that the IP address of the UE is not authenticated and the UE accesses the mobile intelligent access point; and after a 3GPP AAA server verifies a user name and a password successfully, a web portal server initiates challenge authentication to the P-GW or the GGSN, and the P-GW or the GGSN acquires charging information from the 3GPP AAA server.

The process that the UE acquires the access authentication from the network through the mobile intelligent access point may specifically include:

the UE sends an HTTP request message to the mobile intelligent access point;

the mobile intelligent access point forwards the HTTP request message to the P-GW or the GGSN, wherein the HTTP request message includes an address and an SSID of the web portal server;

the P-GW or the GGSN confirms that the IP address of the UE is not authenticated and the UE accesses the mobile intelligent access point;

the P-GW or the GGSN pushes an HTTP response including a user authentication page to the mobile intelligent access point;

the mobile intelligent access point forwards the user authentication page to the UE;

after a user inputs the user name and the password on the authentication page, an HTTP POST request is sent to the web portal server through the mobile intelligent access point, and the P-GW or the GGSN, wherein the HTTP POST request includes the address of the web portal server, the user name and the password;

the web portal server initiates a user information request to the 3GPP AAA server;

the 3GPP AAA server verifies the user name and the password;

after the user name and the password are verified successfully, the 3GPP AAA server sends a user information request response message to the web portal server;

the web portal server initiates challenge authentication to the P-GW or the GGSN, and the P-GW or the GGSN acquires charging information from the 3GPP AAA server; and after the authentication is successful, the web portal server sends an HTTP response including authentication success information to the UE through the P-GW or the GGSN, and the mobile intelligent access point; and the UE performs a data service through the mobile intelligent access point.

The process that the UE acquires the access authentication from the network through the mobile intelligent access point may include:

the UE sends an HTTP request message to the web portal server through the mobile intelligent access point;

the web portal server sends a user authentication page to the UE through the mobile intelligent access point when the web portal server confirms that an IP address of the UE is not authenticated and the UE accesses the mobile intelligent access point; and after a 3GPP AAA server verifies the user name and the password successfully, the web portal server initiates challenge authentication to the mobile intelligent access point, and the mobile intelligent access point acquires charging information from the 3GPP AAA server.

The process that the UE acquires the access authentication from the network through the mobile intelligent access point may specifically include:

the UE sends an HTTP request message to the mobile intelligent access point;

the mobile intelligent access point forwards the HTTP request message to the web portal server, wherein the HTTP request message includes an address and an SSID of the web portal server; or, the mobile intelligent access point sends the HTTP request message to a BRAS, and the BRAS forwards the HTTP request message to the web portal server, wherein the HTTP request message includes an address and an SSID of the web portal server;

the web portal server confirms that the IP address of the UE is not authenticated and the UE accesses the mobile intelligent access point;

the web portal server pushes an HTTP response including a user authentication page to the mobile intelligent access point;

the mobile intelligent access point forwards the user authentication page to the UE;

after a user inputs a user name and a password on the authentication page, an HTTP POST request is sent to the web portal server through the mobile intelligent access point and the P-GW or the GGSN, wherein the HTTP POST request includes the address of the web portal server, the user name and the password;

the web portal server initiates a user information request to the 3GPP AAA server;

the 3GPP AAA server verifies the user name and the password and sends a user information request response message to the web portal server after the user name and the password are verified successfully;

the web portal server initiates challenge authentication to the mobile intelligent access point, and the mobile intelligent access point acquires charging information from the 3GPP AAA server; and after the authentication is successful, the web portal server sends an HTTP response including authentication success information to the UE through the mobile intelligent access point; and the UE performs a data service through the mobile intelligent access point.

A mobile intelligent access point includes: a WiFi AP module, a core processing module, an LTE UE module and a 3G UE module, wherein the LTE UE module is configured to enable the mobile intelligent access point to access an LTE core network via an E-UTRAN;

the 3G UE module is configured to enable the mobile intelligent access point to access a 3G core network via a UTRAN;

the WiFi AP module is configured to enable the mobile intelligent access point to process access of the UE, and enable a terminal supportive of a WiFi function to access the mobile intelligent access point and to perform a related HTTP service after the terminal supportive of the WiFi function is authenticated by the network successfully; and the core processing module is configured to convert WiFi messages/data into LTE or 3G messages/data and convert the LTE or 3G messages/data into the WiFi messages/data.

In the technical solutions provided by the embodiments of the disclosure, the mobile intelligent access point accesses the network through at least two wireless technologies; the UE establishes the connection with the mobile intelligent access point; and the UE acquires the access authentication from the network through the mobile intelligent access point. With the disclosure, network authentication can be implemented to facilitate an operator to control the number of access users and to guarantee the network of the operator. Furthermore, a broadband mobile network is taken as a backhaul network, so as to reduce the reliability on a fixed network and improve the utilization of the broadband mobile network.

DETAILED DESCRIPTION

The basic idea of the embodiments of the disclosure is: a mobile intelligent access point accesses a network through at least two wireless technologies; a UE establishes a connection with the mobile intelligent access point; and the UE acquires access authentication from the network through the mobile intelligent access point.

Figure 1:
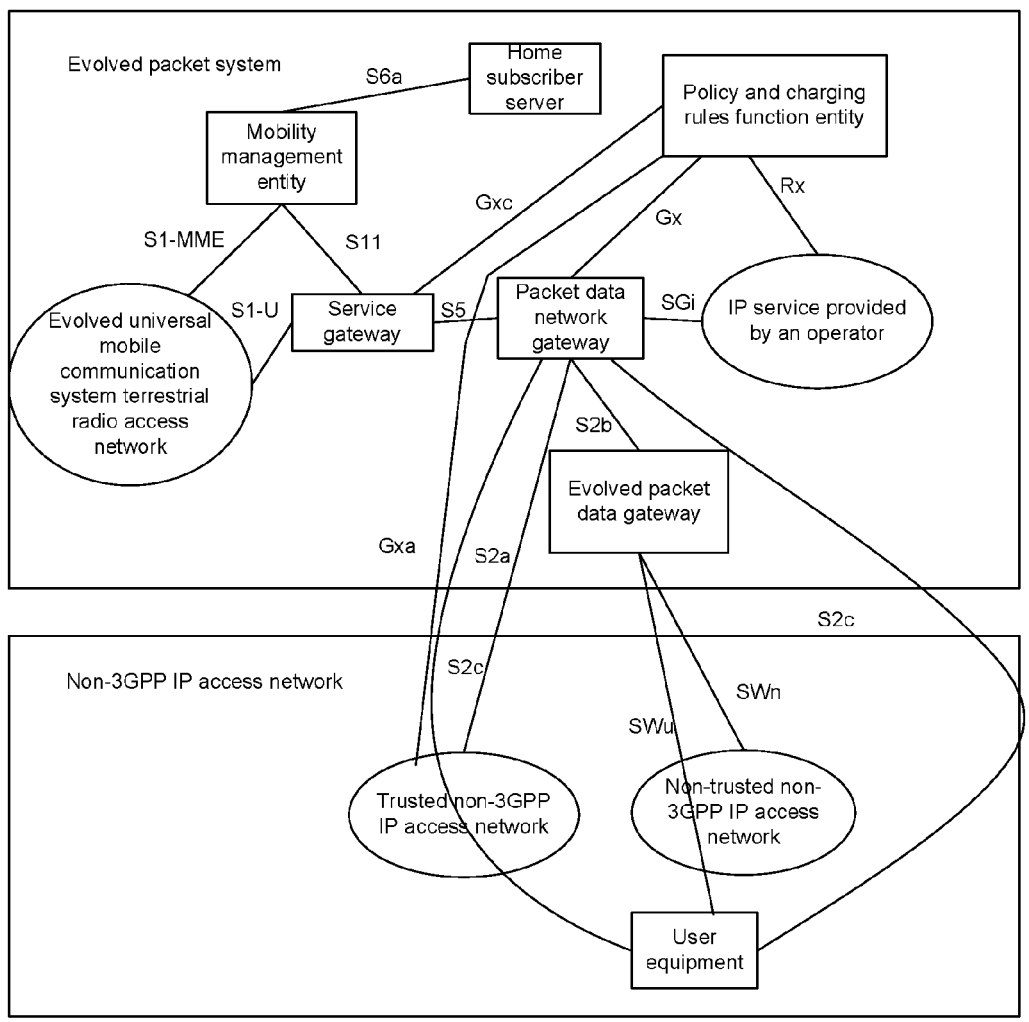
FIG. 1 is a diagram showing the system architecture of an EPS in the related art.
Figure 2:
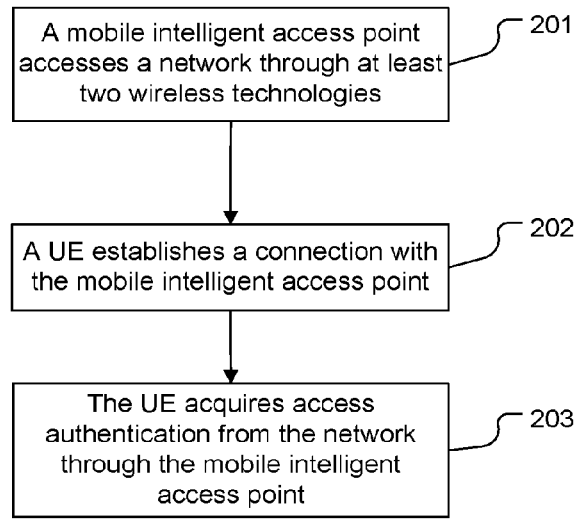
FIG. 2 is a flowchart of an access method provided by an embodiment of the disclosure.

FIG. 2 is a flowchart of an access method provided by an embodiment of the disclosure. As shown in FIG. 2, the method includes:

Step 201: A mobile intelligent access point accesses a network through at least two wireless technologies.

For example, the mobile intelligent access point accesses an LTE core network and a 3G core network through an E-UTRAN and a UTRAN respectively.

Step 202: A UE establishes a connection with the mobile intelligent access point.

Step 203: The UE acquires access authentication from the network through the mobile intelligent access point.

Figure 3:
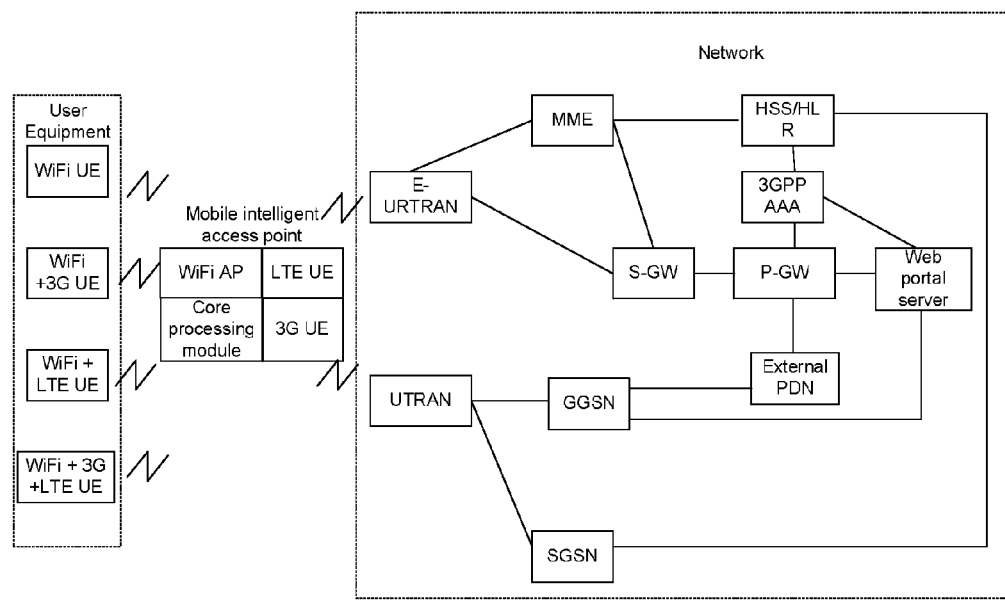
FIG. 3 is a diagram showing the structure of an access system provided by an embodiment of the disclosure.

FIG. 3 is a diagram showing the structure of an access system provided by an embodiment of the disclosure. As shown in FIG. 3, compared with the existing EPS architecture, a mobile intelligent access point is added in the embodiment, and the system includes: a UE, the mobile intelligent access point and a network.

The mobile intelligent access point is configured to access the network through at least two wireless technologies.

The UE is configured to establish a connection with the mobile intelligent access point and acquire access authentication from the network through the mobile intelligent access point.

The network is further configured to provide an uplink data policy of the mobile intelligent access point to the mobile intelligent access point after the mobile intelligent access point accesses the network; and the mobile intelligent access point is further configured to select different data connections according to the uplink data policy to transmit uplink data after receiving the uplink data.

The mobile intelligent access point mainly includes: a WiFi AP module, a core processing module, an LTE UE module and a 3G UE module.

The LTE UE module is configured to enable the mobile intelligent access point to access an LTE core network via an E-UTRAN.

The 3G UE module is configured to enable the mobile intelligent access point to access a 3G core network via a UTRAN, and a 3G UE can also access an SGSN via a UTRAN and then access an LTE core network.

The WiFi AP module is configured to enable the mobile intelligent access point to process the access of the UE (such as a WiFi terminal), and enable a terminal supportive of a WiFi function to access the mobile intelligent access point and to perform a related HTTP service after the terminal supportive of the WiFi function is authenticated by the network successfully.

The core processing module is configured to convert WiFi messages/data into LTE or 3G messages/data and convert the LTE or 3G messages/data into the WiFi messages/data.

The LTE core network includes: an MME, an S-GW, a P-GW, a 3GPP AAA server and an HSS. The HSS and a Home Location Register (HLR) can be a same entity and can serve the 3G network and the LTE network at the same time, which are collectively referred to as an HSS/HLR for the purpose of convenient description.

The process that the UE acquires the access authentication from the network through the mobile intelligent access point can include:

the UE sends an HTTP request message to a P-GW or a GGSN through the mobile intelligent access point;

the P-GW or the GGSN sends a user authentication page to the UE through the mobile intelligent access point when the P-GW or the GGSN confirms that an IP address of the UE is not authenticated and the UE accesses the mobile intelligent access point; and after a 3GPP AAA server verifies a user name and a password successfully, a web portal server initiates challenge authentication to the P-GW or the GGSN, and the P-GW or the GGSN acquires charging information from the 3GPP AAA server.

The process that the UE acquires the access authentication from the network through the mobile intelligent access point specifically includes:

the UE sends an HTTP request message to the mobile intelligent access point;

the mobile intelligent access point forwards the HTTP request message to the P-GW or the GGSN, wherein the HTTP request message includes an address and an SSID of the web portal server;

the P-GW or the GGSN confirms that the IP address of the UE is not authenticated and the UE accesses the mobile intelligent access point;

the P-GW or the GGSN pushes an HTTP response including a user authentication page to the mobile intelligent access point;

the mobile intelligent access point forwards the user authentication page to the UE;

after a user inputs the user name and the password on the authentication page, an HTTP POST request is sent to the web portal server through the mobile intelligent access point, and the P-GW or the GGSN, and the HTTP POST request includes the address of the web portal server, the user name and the password;

the web portal server initiates a user information request to the 3GPP AAA server;

the 3GPP AAA server verifies the user name and the password;

after the user name and the password are verified successfully, the 3GPP AAA server sends a user information request response message to the web portal server;

the web portal server initiates challenge authentication to the P-GW or the GGSN, and the P-GW or the GGSN acquires charging information from the 3GPP AAA server; and after the authentication is successful, the web portal server sends an HTTP response including authentication success information to the UE through the P-GW or the GGSN, and the mobile intelligent access point; and the UE performs a data service through the mobile intelligent access point.

The process that the UE acquires the access authentication from the network through the mobile intelligent access point can also include:

the UE sends an HTTP request message to the web portal server through the mobile intelligent access point;

the web portal server sends a user authentication page to the UE through the mobile intelligent access point when the web portal server confirms that an IP address of the UE is not authenticated and the UE accesses the mobile intelligent access point; and after a 3GPP AAA server verifies the user name and the password successfully, the web portal server initiates challenge authentication to the mobile intelligent access point, and the mobile intelligent access point acquires charging information from the 3GPP AAA server.

The process that the UE acquires the access authentication from the network through the mobile intelligent access point specifically includes:

the UE sends an HTTP request message to the mobile intelligent access point;

the mobile intelligent access point forwards the HTTP request message to the web portal server to the web portal server, wherein the HTTP request message includes an address and an SSID of the web portal server; or, the mobile intelligent access point sends the HTTP request message to a BRAS, and the BRAS forwards the HTTP request message to the web portal server, wherein the HTTP request message includes an address and an SSID of the web portal server;

the web portal server confirms that the IP address of the UE is not authenticated and the UE accesses the mobile intelligent access point;

the web portal server pushes an HTTP response including a user authentication page to the mobile intelligent access point;

the mobile intelligent access point forwards the user authentication page to the UE;

after a user inputs a user name and a password on the authentication page, an HTTP POST request is sent to the web portal server through the mobile intelligent access point and the P-GW or the GGSN, and the HTTP POST request includes the address of the web portal server, the user name and the password;

the web portal server initiates a user information request to the 3GPP AAA server;

the 3GPP AAA server verifies the user name and the password and sends a user information request response message to the web portal server after the user name and the password are verified successfully;

the web portal server initiates challenge authentication to the mobile intelligent access point, and the mobile intelligent access point acquires charging information from the 3GPP AAA server; and after the authentication is successful, the web portal server sends an HTTP response including authentication success information to the UE through the mobile intelligent access point; and the UE performs a data service through the mobile intelligent access point.

In the disclosure, the LTE core network/the 3G core network provides the mobile intelligent access point with the uplink data policy, namely, the P-GW or the GGSN issues the policy of the mobile intelligent access point to the mobile intelligent access point, and the mobile intelligent access point selects to access the E-UTRAN or the UTRAN according to the policy after uplink data of an access user are received by the mobile intelligent access point. A downlink data policy is also determined by the LTE core network/the 3G core network. Furthermore, during the accessing process of the mobile intelligent access point, the LTE core network/ the 3G core network allocates a single IP address to the mobile intelligent access point and provides authentication to the mobile intelligent access point, and allocates an IP address to a UE accessing the mobile intelligent access point and provides an authentication page to the UE accessing to the mobile intelligent access point.

It should be noted that the mobile intelligent access point can further acquire an IP address from a 3G/LTE network for the access terminal, and forward the IP address to the access terminal. The mobile intelligent access point can further forward an HTTP request of a UE. Alternatively, the mobile intelligent access point allocates an IP address to a UE locally, and can forward the HTTP request of the UE to a web portal server; the web portal server sends an authentication page to the UE through the mobile intelligent access point; a user inputs a user name and a password on the authentication page and then the user name and the password are forwarded to the web portal server; and the web portal server and the 3GPP AAA server authenticate the user.

It should be noted that, in the disclosure, the UE can be a single-mode UE supportive of WiFi, a dual-mode UE supportive of WiFi and 3G, a dual-mode UE supportive of WiFi and LTE, or a tri-mode UE supportive of WiFi, 3G and LTE, which is collectively referred to as a UE for the purpose of convenient description. For a multi-mode UE, in case of any access way in which a signal is weak, a service can be continuously switched to through an existing implementation method an access way in which a signal is strong.

The web portal server can provide the authentication page to the UE accessing the mobile intelligent access point, and authenticates the user accessing the mobile intelligent access point with the 3GPP AAA server at the same time.

Preferred embodiments of the disclosure are described below with reference to the drawings. It should be understood that the preferred embodiments herein are intended to describe and explain the disclosure instead of limiting the disclosure. In the following description, for the purpose of explaining, many specific details are described to full understand the disclosure. However, obviously, the disclosure can also be implemented without these specific details. In addition, in the case of no conflict, namely in the case of not departing from the spirit and scope of the claims, the following embodiments and every detail thereof can be combined freely.

Embodiment 1

Figure 4:
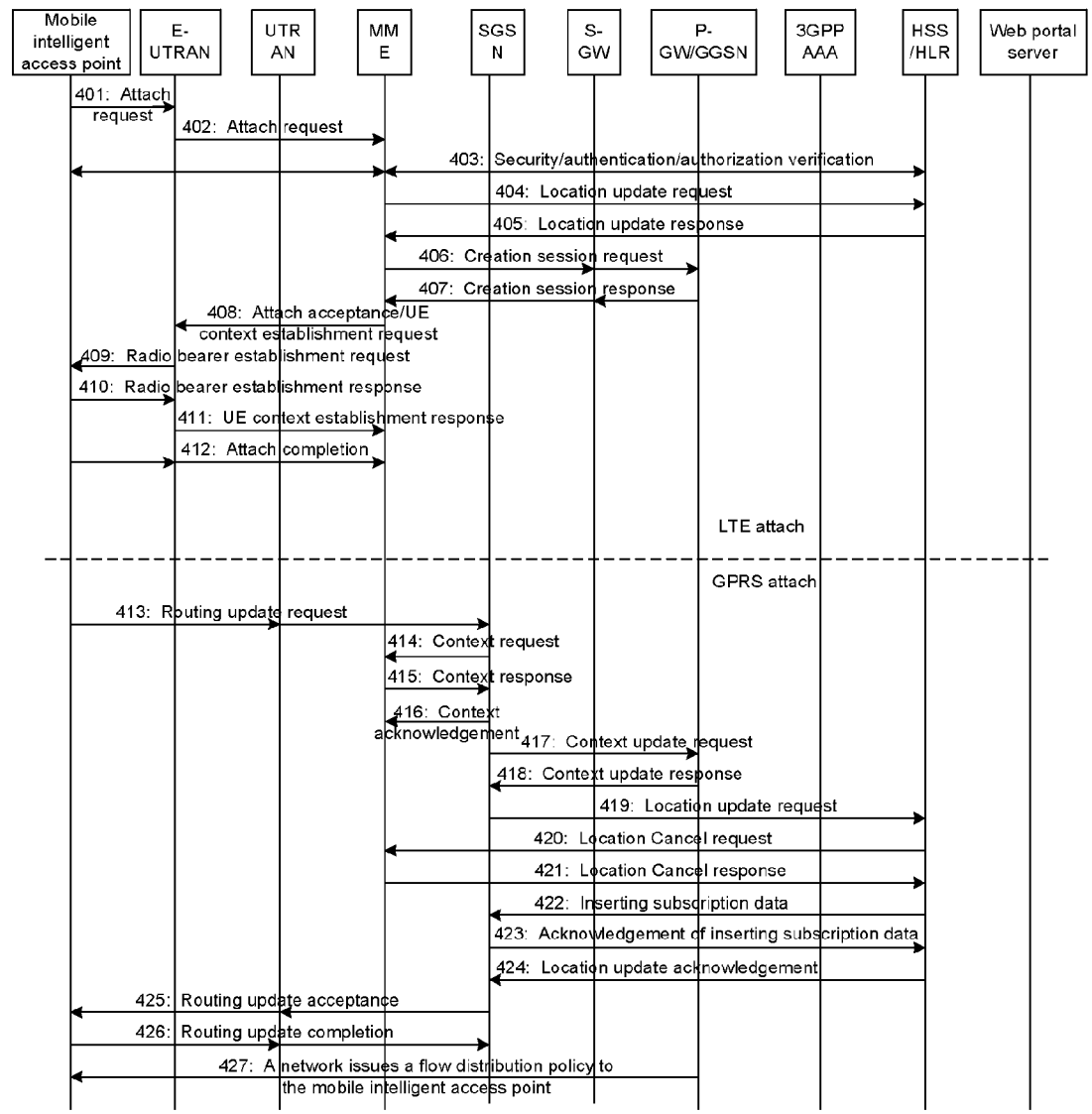
FIG. 4 is a flowchart that a mobile intelligent access point accesses an LTE core network and a 3G core network via an E-UTRAN and a UTRAN respectively according to Embodiment 1 of the disclosure.

FIG. 4 is a flowchart that a mobile intelligent access point accesses an LTE core network and a 3G core network via an E-UTRAN and a UTRAN according to Embodiment 1 of the disclosure. As shown in FIG. 4, the flow includes:

Steps 401 to 402: The mobile intelligent access point initiates an attach process and registers to an LTE core network when the mobile intelligent access point is powered on. The non-access-stratum message is encapsulated in an initialization user message of an S1 interface by an E-UTRAN to be transmitted to an MME.

Step 403: If there is no context information of the mobile intelligent access point in the network or an attach request message lacks integrity protection or the integrity protection is failed, the MME of the core network authenticates the mobile intelligent access point.

Steps 404 to 405: If there is no subscription data of the mobile intelligent access point in the MME, a location update request message is sent to an HSS/HLR, and the location update request message includes an MME identifier, a user identifier, an update type and other information. The HSS sends the user subscription data to the MME in a location update request message, and the location update request message includes a subscription APN and a QoS parameter borne by default by each APN.

Steps 406 to 407: In order to support the user to be always online, the MME establishes the default bearer of the core network side between the S-GW and the P-GW through the QoS parameter of the subscription default bearer. The MME sends a creation session request to the P-GW through the S-GW, and the creation session request includes related QoS parameters of the default bearer, charging features and other related parameters. The P-GW authorizes the requested bearer QoS parameter, and sends a creation session response to the MME through the S-GW.

Step 408: A corresponding radio bearer needs to be activated after the default beater of the core network side is established completely. The MME sends the context of the mobile intelligent access point and the established bearer QoS parameter to the E-UTRAN through a context establishment request message of the UE. An attach acceptance message is also encapsulated in the context establishment request message to be sent to the UE. The attach acceptance message includes a temporary user identifier allocated from the MME to the mobile intelligent access point and a bearer context request established for the mobile intelligent access point.

Steps 409 to 410: The E-UTRAN establishes a corresponding air interface bearer (radio bearer) according to the bearer information indicated by the core network.

Step 411: The base station returns a context establishment response message to a UE to notify the core network after the air interface bearer is established completely.

Step 412: The mobile intelligent access point returns an attach completion message to the MME via the E-UTRAN.

Step 413: The mobile intelligent access point moves to the UTRAN and sends a routing area update request message including a valid temporary user identifier, to the SGSN via the UTRAN.

Step 414: The SGSN confirms the MME registered originally by the mobile intelligent access point according to the temporary user identifier of the mobile intelligent access point, and sends a context request message to the MME.

Step 415: The MME authenticates the mobile intelligent access point, and sends the context of the mobile intelligent access point to the SGSN after the mobile intelligent access point is authenticated successfully.

Step 416: The SGSN returns a context response to the MME after receiving the context of the mobile intelligent access point.

Steps 417 to 418: If the UE activates the bearer, the SGSN updates a Packet Data Protocol (PDP) context in the GGSN (the PGW has the function of the GGSN). A PDP context update request includes the Tunnel Endpoint Identifier (TEID) and the IP address of a new SGSN. The GGSN stores these information, returns a PDP update response to the new SGSN, and updates the TEID and the IP address of the MME with the TEID and IP address of the SGSN.

Step 419: The SGSN sends a location update request including the identifier of a new SGSN to the HSS/HLR, and the HSS stores the identifier of the new SGSN.

Steps 420 to 421: The HSS/HLR sends a location cancel request to the MME, and does not store the identifier of the MME any more after the MME returns a response to the HSS/HLR.

When the mobile intelligent access point has a single subscriber identifier, the HSS/HLR does not send a location cancel message to the MME according to the subscription of the mobile intelligent access point. When the LTE UE module and 3G UE module of the mobile intelligent access point have different user identifiers, the above steps are executed for the HSS/HLR.

Steps 422 to 424: The HSS/HLR inserts subscription data to the SGSN.

Step 425: The SGSN confirms that the mobile intelligent access point is valid in the current routing area, and sends a routing area update acceptance message including a P-TMSI reassigned for the mobile intelligent access point to the mobile intelligent access point.

Step 426: The mobile intelligent access point returns a routing area update completion message to the SGSN to confirm that the P-TMSI is valid. The mobile intelligent access point marks the related information of the MME as invalid.

Step 427: The P-GW provides an uplink data policy to the mobile intelligent access point.

Embodiment 2

Figure 5:
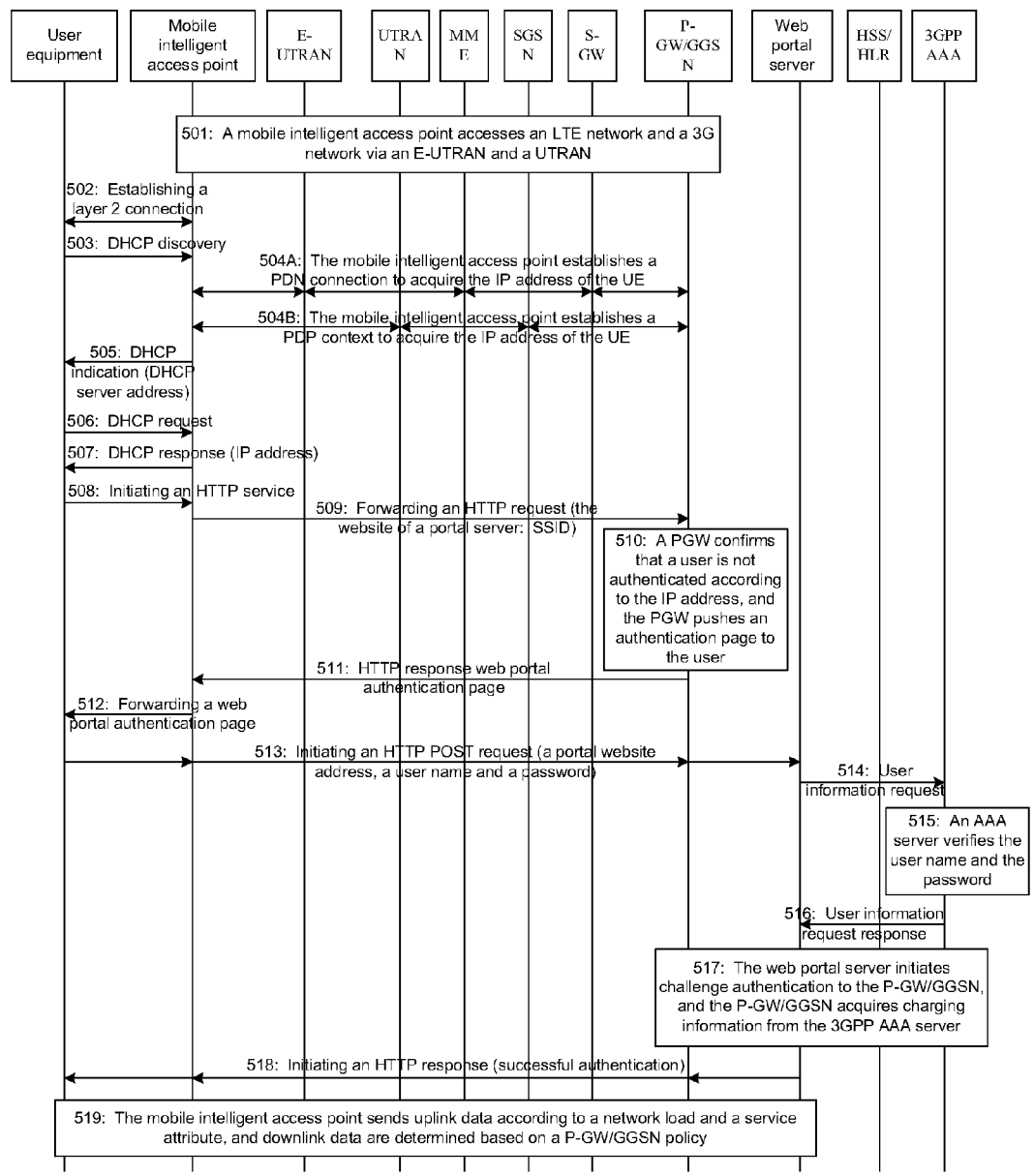
FIG. 5 is a flowchart that a UE accesses a network through a mobile intelligent access point according to Embodiment 2 of the disclosure.

FIG. 5 is a flowchart that a UE accesses a network through a mobile intelligent access point according to Embodiment 2 of the disclosure. As shown in FIG. 5, the flow includes:

Step 501: A mobile intelligent access point accesses an LTE network and a 3G network at the same time, and acquires a control policy of uplink data from a P-GW or a GGSN.

Step 502: The specific layer 2 initial access process of a non-3GPP access network is executed.

Step 503: A UE initiates a Dynamic Host Configuration Protocol (DHCP) discovery process to the mobile intelligent access point.

Step 504A: The mobile intelligent access point initiates a PDN connection request to the P-GW via an E-UTRAN, and the P-GW allocates a corresponding IP address to the UE.

Step 504B: Alternatively, the mobile intelligent access point initiates a PDP context activation request to the P-GW (having the function of the GGSN) via a UTRAN, and the P-GW (having the function of the GGSN) allocates a corresponding IP address to the UE.

Step 505: The mobile intelligent access point returns a DHCP indication message including the address of a DHCP server to the UE, and the address of the DHCP server is the address of the mobile intelligent access point.

Step 506: A UE initiates a DHCP request to the mobile intelligent access point.

Step 507: The mobile intelligent access point returns a DHCP response message to the UE, and the DHCP response message includes the IP address of the UE acquired in Step 504A or Step 504B.

Step 508: The UE sends an HTTP request message to the mobile intelligent access point.

Step 509: The mobile intelligent access point forwards the HTTP request message to the P-GW or the GGSN, and the HTTP request message includes the address and the SSID of a web portal server.

Step 510: The P-GW or the GGSN confirms that the IP address of the UE is not authenticated and that the UE accesses the network through the mobile intelligent access point.

Step 511: The P-GW or the GGSN pushes an HTTP response including a user authentication page to the mobile intelligent access point.

Step 512: The mobile intelligent access point forwards the user authentication page to the UE.

Step 513: After a user inputs a user name and a password on the authentication page, an HTTP POST request is sent to the web portal server via the mobile intelligent access point and the P-GW. The HTTP POST request includes the address of the web portal server, the user name and the password.

Step 514: The web portal server initiates a user information request to a 3GPP AAA server.

Step 515: The 3GPP AAA server verifies the user name and the password.

Step 516: After the user name and the password are verified successfully, the 3GPP AAA server sends a user information request response message to the web portal server.

Step 517: The web portal server initiates challenge authentication to the P-GW or the GGSN, and the P-GW or the GGSN acquires charging information from the 3GPP AAA server.

Meanwhile, the P-GW or the GGSN can further acquire a QoS parameter related to a user from a policy server of the user, and modify the QoS parameter of the user according to the QoS parameter of a mobile intelligent access point terminal or update the QoS parameter of the policy server of the mobile intelligent access point, to guarantee the QoS of the user.

Step 518: After the authentication is successful, the web portal server sends an HTTP response including authentication success information to the UE through the P-GW or the GGSN, and the mobile intelligent access point.

Step 519: After the authentication is successful, the UE can perform a data service through the mobile intelligent access point, and the data of the UE is sent out from the mobile intelligent access point via the LTE network or the 3G network selected based on the network policy. Specifically, the mobile intelligent access point sends uplink data according to a network load and a service attribute and downlink data are determined based on a P-GW or GGSN policy.

Embodiment 3

Figure 6:
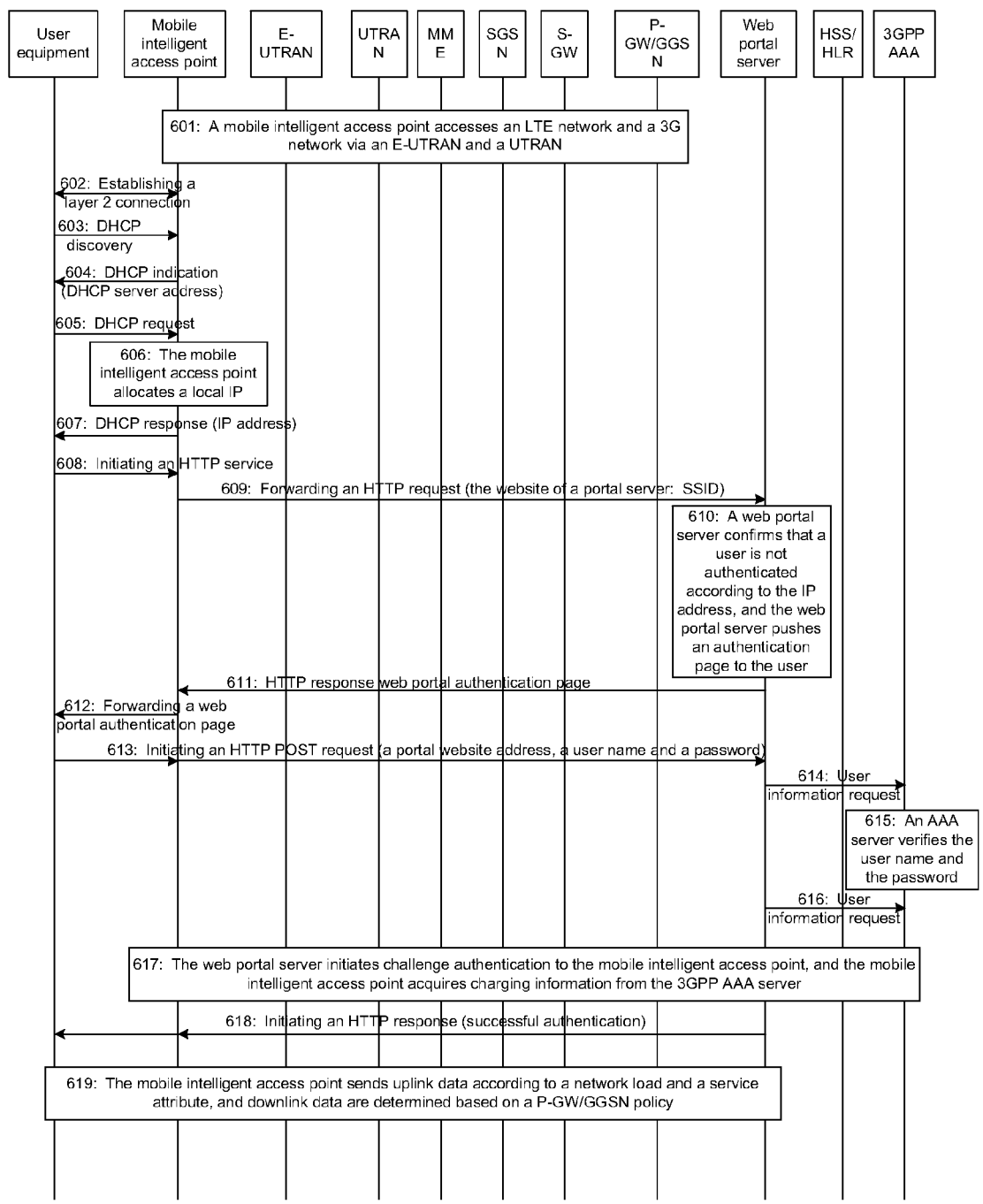
FIG. 6 is a flowchart that a UE accesses a network through a mobile intelligent access point according to Embodiment 3 of the disclosure.

FIG. 6 is a flowchart that a UE accesses a network through a mobile intelligent access point according to Embodiment 3 of the disclosure. As shown in FIG. 6, the flow includes:

Step 601: A mobile intelligent access point accesses an LTE network and a 3G network at the same time, and acquires a control policy of uplink data from a P-GW or a GGSN.

Step 602: The specific layer 2 initial access flow of a non-3GPP access network is executed.

Step 603: A UE initiates a DHCP discovery process to the mobile intelligent access point.

Step 604: The mobile intelligent access point returns a DHCP indication message including the address of a DHCP server to the UE, and the address of the DHCP server is the address of the mobile intelligent access point.

Step 605: A UE initiates a DHCP request to the mobile intelligent access point.

Step 606: The mobile intelligent access point allocates a local IP address to the UE.

Step 607: The mobile intelligent access point returns a DHCP response message to the UE, and the DHCP response message includes the IP address allocated from the mobile intelligent access point to the UE in Step 606.

Step 608: The UE sends an HTTP request message to the mobile intelligent access point.

Step 609: The mobile intelligent access point forwards an HTTP request message to the web portal server, and the HTTP request message includes the address and the SSID of a web portal server.

The mobile intelligent access point can also send the HTTP request to a BRAS, and then the BRAS forwards the HTTP request to the web portal server.

Step 610: The web portal server confirms that the IP address of the UE is not authenticated and that the UE accesses the network through the mobile intelligent access point.

Step 611: The web portal server pushes an HTTP response including a user authentication page to the mobile intelligent access point.

Step 612: The mobile intelligent access point forwards the user authentication page to the UE.

Step 613: After a user inputs a user name and a password on the authentication page, an HTTP POST request is sent to the web portal server through the mobile intelligent access point and the P-GW. The HTTP POST request includes the address of the web portal server, the user name and the password.

Step 614: The web portal server initiates a user information request to a 3GPP AAA server.

Step 615: The 3GPP AAA server verifies the user name and the password.

Step 616: After the user name and the password are verified successfully, the 3GPP AAA server sends a user information request response message to the web portal server.

Step 617: The web portal server initiates challenge authentication to the mobile intelligent access point, and the mobile intelligent access point acquires charging information from the 3GPP AAA server.

Meanwhile, the mobile intelligent access point can further acquire a related QoS parameter related to a user from the policy server of the user, and modify the QoS parameter of the user according to the QoS parameter of a mobile intelligent access point terminal or update the QoS parameter of the policy server of the mobile intelligent access point through the P-GW or the GGSN, to guarantee the QoS of the user.

Step 618: After the authentication is successful, the web portal server sends an HTTP response including authentication success information to the UE through the mobile intelligent access point.

Step 619: After the authentication is successful, the UE can perform a data service through the mobile intelligent access point, and the data of the UE is sent out from the mobile intelligent access point via the LTE network or the 3G network selected based on the network policy. Specifically, the mobile intelligent access point can send uplink data according to a network load and a service attribute, and downlink data are determined based on a P-GW or GGSN policy.

The above are only preferable embodiments of the disclosure, and are not intended to limit the scope of protection of the claims of the disclosure. Those skilled in the art can make various modifications and variations to the disclosure. Any modifications, equivalent substitutions, improvements or the like made within the concept and principle of the disclosure shall fall within the scope of protection of the claims of the disclosure.

The invention claimed is:

1. An access method, comprising:
accessing, by a mobile intelligent access point, a network through at least two wireless technologies;
establishing, by a User Equipment (UE), a connection with the mobile intelligent access point; and
acquiring, by the UE, access authentication from the network through the mobile intelligent access point;
wherein the step of acquiring, by the UE, access authentication from the network through the mobile intelligent access point comprises:
sending, by the UE, a Hyper Text Transport Protocol (HTTP) request message to a Packet Data Network Gateway (P-GW) or a Gateway GPRS Support Node (GGSN) through the mobile intelligent access point;
sending, by the P-GW or the GGSN, a user authentication page to the UE through the mobile intelligent access point when the P-GW or the GGSN confirms that an Internet Protocol (IP) address of the UE is not authenticated and the UE accesses the network through the mobile intelligent access point; and
after a 3rd Generation Partnership Project Authentication, Authorization and Accounting (3GPP AAA) server verifies a user name and a password successfully, initiating, by a web portal server, challenge authentication to the P-GW or the GGSN, and acquiring, by the P-GW or the GGSN, charging information from the 3GPP AAA server;
wherein the step of acquiring, by the UE, the access authentication from the network through the mobile intelligent access point comprises:
sending, by the UE, an HTTP request message to the mobile intelligent access point;
forwarding, by the mobile intelligent access point, the HTTP request message to the P-GW or the GGSN, wherein the HTTP request message includes an address and a Service Set Identifier (SSID) of the web portal server;
confirming, by the P-GW or the GGSN, that the IP address of the UE is not authenticated and the UE accesses the network through the mobile intelligent access point;
pushing, by the P-GW or the GGSN, an HTTP response including a user authentication page to the mobile intelligent access point;
forwarding, by the mobile intelligent access point, the user authentication page to the UE;
after a user inputs the user name and the password on the authentication page, sending an HTTP POST request to the web portal server through the mobile intelligent access point, and the P-GW or the GGSN, wherein the HTTP POST request includes the address of the web portal server, the user name and the password;
initiating, by the web portal server, a user information request to the 3GPP AAA server;
verifying, by the 3GPP AAA server, the user name and the password;
after the user name and the password are verified successfully, sending, by the 3GPP AAA server, a user information request response message to the web portal server;
initiating, by the web portal server, challenge authentication to the P-GW or the GGSN, and acquiring, by the P-GW or the GGSN, charging information from the 3GPP AAA server; and
after the authentication is successful, sending, by the web portal server, an HTTP response including authentication success information to the UE through the P-GW or the GGSN, and the mobile intelligent access point; and
performing, by the UE, a data service through the mobile intelligent access point.

2. The method according to claim 1, further comprising:
after the mobile intelligent access point accesses the network, providing, by the network, an uplink data policy of the mobile intelligent access point to the mobile intelligent access point; and
selecting, by the mobile intelligent access point, different data connections according to the uplink data policy to transmit uplink data after the uplink data are received by the mobile intelligent access point.

3. An access method, comprising:
accessing, by a mobile intelligent access point, a network through at least two wireless technologies;
establishing, by a User Equipment (UE), a connection with the mobile intelligent access point; and
acquiring, by the UE, access authentication from the network through the mobile intelligent access point,
herein the step of acquiring, by the UE, access authentication from the network through the mobile intelligent access point comprises:
sending, by the UE, an HTTP request message to a web portal server through the mobile intelligent access point;
sending, by the web portal server, a user authentication page to the UE through the mobile intelligent access point when the web portal server confirms that an IP address of the UE is not authenticated and the UE accesses the network through the mobile intelligent access point; and
after a 3GPP AAA server verifies the user name and the password successfully, initiating, by the web portal server, challenge authentication to the mobile intelligent access point, and acquiring, by the mobile intelligent access point, charging information from the 3GPP AAA server;

wherein the step of acquiring, by the UE, access authentication from the network through the mobile intelligent access point comprises:

sending, by the UE, an HTTP request message to the mobile intelligent access point;

forwarding, by the mobile intelligent access point, the HTTP request message to the web portal server, wherein the HTTP request message includes an address and an SSID of the web portal server; or, sending, by the mobile intelligent access point, the HTTP request message to a Broadband Remote Access Server (BRAS), and forwarding, by the BRAS, the HTTP request message to the web portal server, wherein the HTTP request message includes an address and an SSID of the web portal server;

confirming, by the web portal server, that the IP address of the UE is not authenticated and the UE accesses the network through the mobile intelligent access point;

pushing, by the web portal server, an HTTP response including a user authentication page to the mobile intelligent access point;

forwarding, by the mobile intelligent access point, the user authentication page to the UE;

after a user inputs the user name and the password on the authentication page, sending an HTTP POST request to the web portal server through the mobile intelligent access point, and the P-GW or the GGSN, wherein the HTTP POST request includes the address of the web portal server, the user name and the password;

initiating, by the web portal server, a user information request to the 3GPP AAA server;

verifying, by the 3GPP AAA server, the user name and the password, and sending a user information request response message to the web portal server after the user name and the password are verified successfully;

initiating, by the web portal server, challenge authentication to the mobile intelligent access point, and acquiring, by the mobile intelligent access point, charging information from the 3GPP AAA server; and after the authentication is successful, sending, by the web portal server, an HTTP response including authentication success information to the UE through the mobile intelligent access point; and performing, by the UE, a data service through the mobile intelligent access point.

4. An access system, comprising: a User Equipment (UE), a mobile intelligent access point and a network, wherein the mobile intelligent access point is configured to access the network through at least two wireless technologies; and the UE is configured to establish a connection with the mobile intelligent access point and acquire access authentication from the network through the mobile intelligent access point;

wherein the process that the UE acquires the access authentication from the network through the mobile intelligent access point comprises:

the UE sends a Hyper Text Transport Protocol (HTTP) request message to a Packet Data Network Gateway (P-GW) or a Gateway GPRS Support Node (GGSN) through the mobile intelligent access point;

the P-GW or the GGSN sends a user authentication page to the UE through the mobile intelligent access point when the P-GW or the GGSN confirms that an Internet Protocol (IP) address of the UE is not authenticated and the UE accesses the network through the mobile intelligent access point; and after a 3rd Generation Partnership Project Authentication, Authorization and Accounting (3GPP AAA) server verifies a user name and a password successfully, a web portal server initiates challenge authentication to the P-GW or the GGSN, and the P-GW or the GGSN acquires charging information from the 3GPP AAA server wherein the process that the UE acquires the access authentication from the network through the mobile intelligent access point comprises:

the UE sends an HTTP request message to the mobile intelligent access point;

the mobile intelligent access point forwards the HTTP request message to the P-GW or the GGSN, wherein the HTTP request message includes an address and a Service Set Identifier (SSID) of the web portal server;

the P-GW or the GGSN confirms that the IP address of the UE is not authenticated and the UE accesses the network through the mobile intelligent access point;

the P-GW or the GGSN pushes an HTTP response including a user authentication page to the mobile intelligent access point;

the mobile intelligent access point forwards the user authentication page to the UE;

after a user inputs the user name and the password on the authentication page, an HTTP POST request is sent to the web portal server through the mobile intelligent access point, and the P-GW or the GGSN, wherein the HTTP POST request includes the address of the web portal server, the user name and the password;

the web portal server initiates a user information request to the 3GPP AAA server;

the 3GPP AAA server verifies the user name and the password;

after the user name and the password are verified successfully, the 3GPP AAA server sends a user information request response message to the web portal server;

the web portal server initiates challenge authentication to the P-GW or the GGSN, and the P-GW or the GGSN acquires charging information from the 3GPP AAA server; and after the authentication is successful, the web portal server sends an HTTP response including authentication success information to the UE through the P-GW or the GGSN, and the mobile intelligent access point; and the UE performs a data service through the mobile intelligent access point.

5. The system according to claim 4, wherein the network is further configured to provide an uplink data policy of the mobile intelligent access point to the mobile intelligent access point after the mobile intelligent access point accesses the network; and the mobile intelligent access point is further configured to select different data connections according to the uplink data policy to transmit uplink data after receiving the uplink data.

6. The system according to claim 4, wherein the mobile intelligent access point comprises: a Wireless Fidelity (WiFi) Access Point (AP) module, a core processing module, a Long Term Evolution (LTE) UE module and a 3rd Generation (3G) UE module, wherein the LTE UE module is configured to enable the mobile intelligent access point to access an LTE core network via an Evolved Universal Terrestrial Radio Access Network (E-UTRAN);

the 3G UE module is configured to enable the mobile intelligent access point to access a 3G core network via a Universal Terrestrial Radio Access Network (UTRAN);

the WiFi AP module is configured to enable the mobile intelligent access point to process access of the UE, and enable a terminal supportive of a WiFi function to access the mobile intelligent access point and to perform a related HTTP service after the terminal supportive of the WiFi function is authenticated by the network successfully; and the core processing module is configured to convert WiFi messages/data into LTE or 3G messages/data and convert the LTE or 3G messages/data into the WiFi messages/data.

7. An access system, comprising: a User Equipment (UE), a mobile intelligent access point and a network, wherein the mobile intelligent access point is configured to access the network through at least two wireless technologies; and the UE is configured to establish a connection with the mobile intelligent access point and acquire access authentication from the network through the mobile intelligent access point, wherein the process that the UE acquires the access authentication from the network through the mobile intelligent access point comprises:

the UE sends an HTTP request message to the web portal server through the mobile intelligent access point;

the web portal server sends a user authentication page to the UE through the mobile intelligent access point when the web portal server confirms that an IP address of the UE is not authenticated and the UE accesses the network through the mobile intelligent access point; and after a 3GPP AAA server verifies the user name and the password successfully, the web portal server initiates challenge authentication to the mobile intelligent access point, and the mobile intelligent access point acquires charging information from the 3GPP AAA server;

wherein the process that the UE acquires the access authentication from the network through the mobile intelligent access point comprises:

the UE sends an HTTP request message to the mobile intelligent access point;

the mobile intelligent access point forwards the HTTP request message to the web portal server, wherein the HTTP request message includes an address and an SSID of the web portal server; or, the mobile intelligent access point sends the HTTP request message to a Broadband Remote Access Server (BRAS), and the BRAS forwards the HTTP request message to the web portal server, wherein the HTTP request message includes an address and an SSID of the web portal server;

the web portal server confirms that the IP address of the UE is not authenticated and the UE accesses the network through the mobile intelligent access point;

the web portal server pushes an HTTP response including a user authentication page to the mobile intelligent access point;

the mobile intelligent access point forwards the user authentication page to the UE;

after a user inputs a user name and a password on the authentication page, an HTTP POST request is sent to the web portal server through the mobile intelligent access point, and the P-GW or the GGSN, wherein the HTTP POST request includes the address of the web portal server, the user name and the password;

the web portal server initiates a user information request to the 3GPP AAA server;

the 3GPP AAA server verifies the user name and the password, and sends a user information request response message to the web portal server after the user name and the password are verified successfully;

the web portal server initiates challenge authentication to the mobile intelligent access point, and the mobile intelligent access point acquires charging information from the 3GPP AAA server; and after the authentication is successful, the web portal server sends an HTTP response including authentication success information to the UE through the mobile intelligent access point; and the UE performs a data service through the mobile intelligent access point.

* * * * *